United States Patent

Beckeman

[11] Patent Number: 6,153,241
[45] Date of Patent: *Nov. 28, 2000

[54] METHOD AND A PACKAGE FOR EXTENDING THE SHELF LIFE OF A FOOD

[75] Inventor: Claes-Göran Beckeman, Lund, Sweden

[73] Assignee: Tetra Laval Holdings & Finance S.A., Pully, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/981,598

[22] PCT Filed: Jul. 1, 1996

[86] PCT No.: PCT/SE96/00880

§ 371 Date: Dec. 31, 1997

§ 102(e) Date: Dec. 31, 1997

[87] PCT Pub. No.: WO97/02182

PCT Pub. Date: Jan. 23, 1997

[30] Foreign Application Priority Data

Jul. 3, 1995 [SE] Sweden .................................. 9502415

[51] Int. Cl.⁷ ...................................................... B65B 5/04
[52] U.S. Cl. .......................... 426/412; 426/325; 426/397; 426/401; 426/410; 53/440; 53/442; 99/349; 99/369
[58] Field of Search ..................................... 426/412, 397, 426/401, 410, 325; 53/440, 442; 99/349, 369

[56] References Cited

U.S. PATENT DOCUMENTS

| | | | |
|---|---|---|---|
| 2,380,134 | 7/1945 | Walters | 99/182 |
| 3,052,559 | 9/1962 | Peebles . | |
| 3,190,759 | 6/1965 | Stryk et al. . | |
| 3,913,299 | 10/1975 | Stenstrom . | |
| 4,364,220 | 12/1982 | Rausing . | |
| 4,510,732 | 4/1985 | Löthman | 53/168 |
| 4,632,026 | 12/1986 | Yamamoto et al. | 99/349 |
| 4,731,250 | 3/1988 | Stark | 426/234 |
| 4,782,643 | 11/1988 | Stark . | |
| 5,338,117 | 8/1994 | Kucksdorf et al. | 383/9 |
| 5,470,016 | 11/1995 | Ljungström et al. . | |
| 5,494,691 | 2/1996 | Sizer . | |
| 5,537,803 | 7/1996 | Olsen | 53/467 |

FOREIGN PATENT DOCUMENTS

| | | |
|---|---|---|
| 0 085 349 | 8/1983 | European Pat. Off. . |
| 0 115 380 | 8/1984 | European Pat. Off. . |
| 329674 | 10/1970 | Sweden . |
| 1277843 | 6/1972 | United Kingdom . |

*Primary Examiner*—Milton Cano
*Assistant Examiner*—Hao Mai
*Attorney, Agent, or Firm*—Burns, Doane, Swecker & Mathis, L.L.P.

[57] ABSTRACT

A method of achieving extended shelf life for a food includes enclosing the food in a discrete container of flexible or foldably formable material, wherein the shape of the container includes predefined crease lines for enabling the formation of the container into at least the following two container positions: a) a first container position obtained by the formation of folds along predefined crease lines such that opposing side wall panels of the container are arranged in relation to one another such that the distance between the side wall panels defines a first distance and b) a second container position obtained without the formation of folds along the predefined crease lines such that opposing side wall panels of the container are arranged in relation to one another such that the distance between the side wall panels defines a second distance. The first distance between the side wall panels is less than the second distance between the side wall panels. The method further includes treating the food in the container with heat in a treatment chamber while the container maintains the first container position, and thereafter, raising the container to the second container position. The second position of the container corresponds to that form under which the container is distributed, sold or used.

10 Claims, 3 Drawing Sheets

METHOD AND A PACKAGE FOR EXTENDING THE SHELF LIFE OF A FOOD

This application is 371 of PCT/SE96/00880 filed on Jul. 1, 1996.

TECHNICAL FIELD

The present invention relates to a method of heat treating a pumpable food for the purpose of extending its shelf life, such treatment being carried out in a treatment chamber, preferably an autoclave, once the food has been enclosed in a container of flexible or foldably formable material. The present invention also relates to a container and an apparatus for reducing the method into practice.

BACKGROUND ART

It has long been known in the art that the shelf life of a food may be extended by subjecting the food to heat treatment which is so thorough that bacteria, fungi and other micro-organisms present in the food are killed-off, neutralised or reduced in number. In order to achieve complete sterilization, the treatment must be carried out under such forms that it is certain that all parts of the treated product are heated to such an elevated degree and for such a length of time as are required for complete destruction or deactivation of the micro-organisms in the product.

Different types of food products require different forms of treatment. For example, milk or lactic products must be subjected to more extensive treatment (higher temperature and/or longer treatment time) than, for example, acidic products such as fruit juices of different types. The reason for this is that the basic preconditions for growth of the micro-organisms in an acidic environment are substantially poorer than if the environment is basic or neutral. By way of example, mention might be made of the fact that milk can be sterilized by means of a short heating time up to approximately 140° C., for a few (4 to 10) seconds, while on the other hand orange juice can be treated to complete sterilization at a temperature of approximately 100° C. and less, in a treatment time of a few seconds or a few tenths of a second. Since extensive heating of food products generally gives rise to a deterioration in flavour and also a deterioration in the quality of the finished product, attempts are made in the art to restrict the effects of the heat to as little as possible, which is generally achieved by heating to a relatively high temperature for a short time.

In that case when the product which is to be heat-treated is aqueous (as is the case in milk and juice), heating to a temperature above 100° C. cannot take place without the water in the product being caused to boil, unless the treatment takes place in an enclosed space in which an excess pressure can be maintained and the boiling point of the product can thereby be raised. Such an apparatus goes under the general title of an autoclave, and an autoclave is thus an apparatus which comprises an enclosed treatment chamber in which both temperature and pressure may be controlled and regulated. One of the drawbacks inherent in autoclaving is that the treatment is largely carried out intermittently for a number of objects inserted in the autoclave (so-called batch treatment), and that the treatment time depends on the length of time that elapses to ensure total treatment, i.e. by heating of the product placed in the autoclave.

Since heat is to be supplied to the product through its enclosing or packaging material, and be led in to the central regions of the product, it is advantageous to keep the thermal transfer path to the central areas of the product as short as possible in order thereby to limit the total heating time of the product. The product must, thus, be as thin or flat as possible during the heat treatment, i.e. have a least possible extent in one dimension, but this requirement on the product and its packaging form generally runs counter to other requirements placed on the packaging container, for example that it be of a configuration that makes it easy to distribute and store, and that it must be able to stand upright on its own on a flat substrate without tipping over.

In the present case, this problem is solved in the manner apparent from the appended claims.

BRIEF DESCRIPTION OF THE ACCOMPANYING DRAWINGS

One preferred embodiment of the present invention will now be described in greater detail hereinbelow, with particular reference to the accompanying schematic Drawings, in which:

FIG. 1 shows part of a packaging material web which is provided with a crease line pattern facilitating folding;

FIG. 2 schematically illustrates how a web according to FIG. 1 is formed and filled to make closed packaging containers;

FIG. 3 shows a closed packaging container in the flat-laid or reduced thickness state;

FIG. 4 schematically illustrates an autoclave or heat treatment chamber in which the packaging containers are heated under pressure; and FIG. 5 shows the final packaging container which is filled with sterilized or partially sterilized contents.

DESCRIPTION OF PREFERRED EMBODIMENT

As was mentioned above, autoclave heat-treatment can be carried out on a product which has been enclosed in a formable container consisting of flexible and/or foldable material, for example plastic-coated paper with or without layers of metal foil or other barrier material for gases and aroma substances. The packaging material may also be produced from a plastic film laminate comprising, for example, carrier or core layers of polypropylene, polyester or similar heat resistant plastic material.

In the present case, it will be assumed that the treated and packed product consists of milk and the object of the present invention is to create a package containing a bacteria-reduced or sterile product, and to ensure that substantially prolonged shelf-life has been imparted to the product once it has been packed and treated together with is host packaging.

Figure 1:
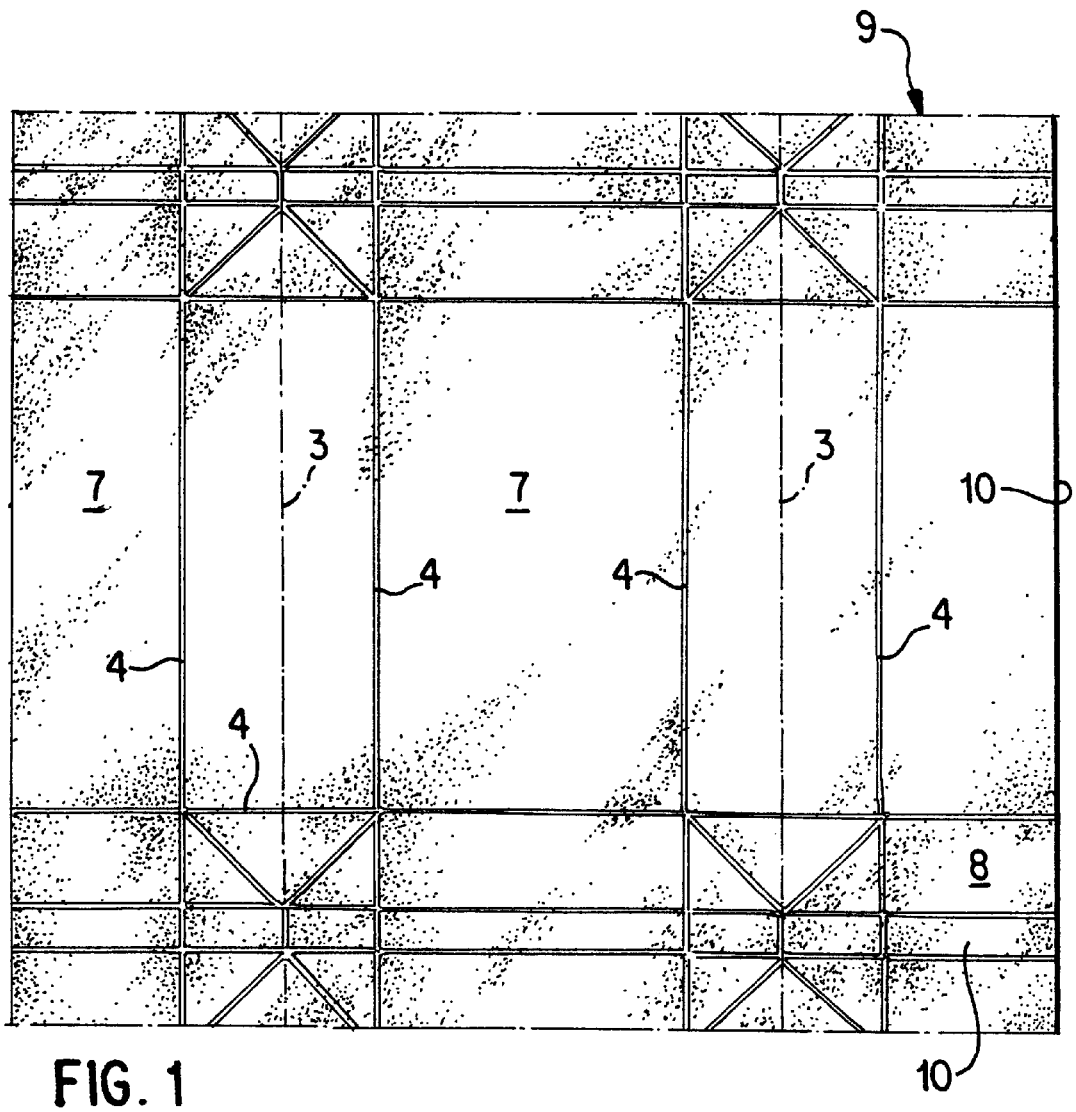

The above-defined technical problem is solved in accordance with the preferred embodiment of the present invention in that, as shown in FIG. 1, a web of packaging material 9 is produced by lamination of carrier layers of paper or plastic, inner and outer sealing layers of thermoplastic, for example polyethylene and, where applicable, barrier layers of metal foil, barrier plastic (such as a copolymer of ethylene and vinyl alcohol, known as EVOH) or plasma deposited glass material. As will be apparent from FIG. 1, the web 9 is divided into fields or panels 7, 8 and 10 by longitudinal and transverse so-called crease lines 4. In the finished package 1;14, the panels 7 and 8 constitute the wall surfaces of the package, while the panels 10 constitute sealing panels along which the packaging material is united in tight and mechanically durable seams or joints inside-to-inside or in overlap joint in that mutually abutting material surfaces are heated to melting point at the same time as they compressed towards one another so that abutting sealing panels are caused to melt and fuse together.

Figure 2:
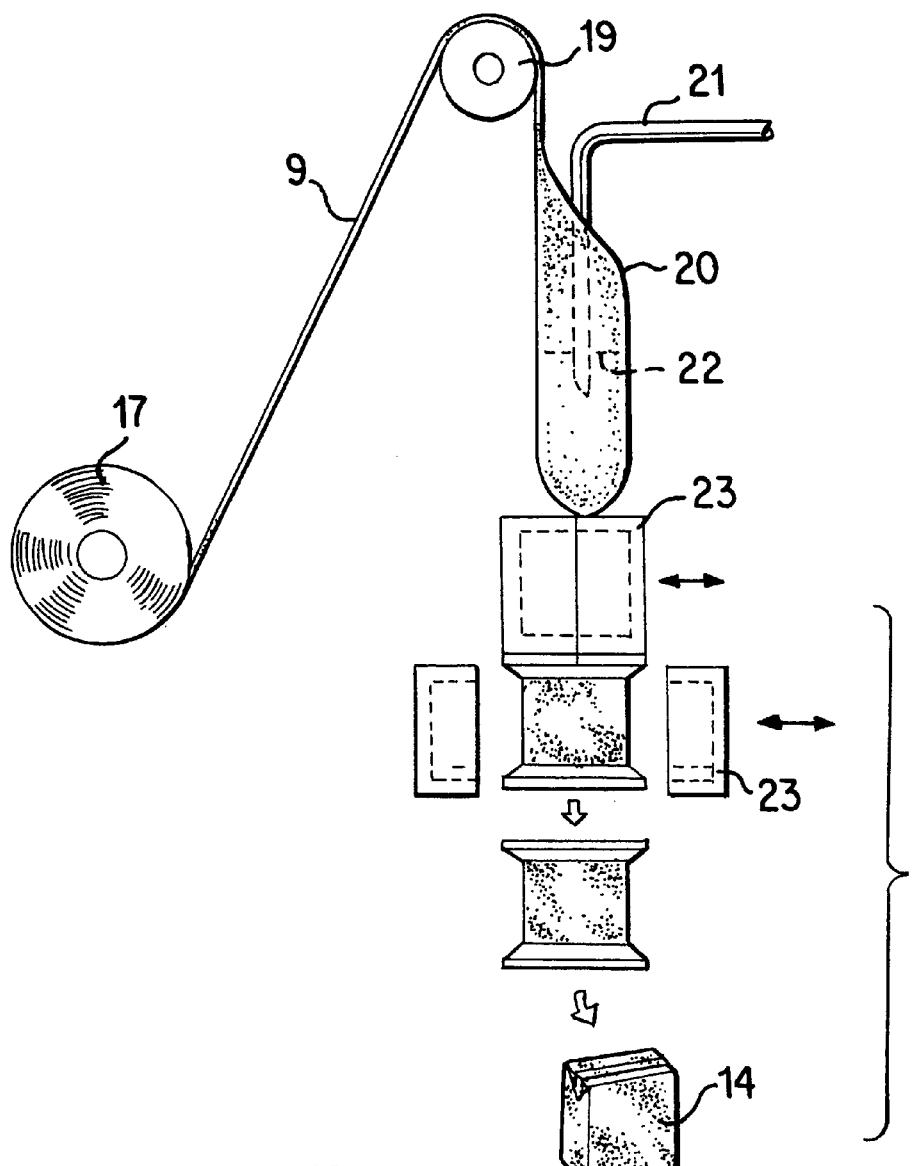

The web 9 may be formed into a tube in that the longitudinal web edges are united to one another in a continuous overlap seal along the sealing panel 10 in the manner which is illustrated schematically in FIG. 2. As is apparent from FIG. 2, the web 9 is unwound from a magazine reel 17 and is passed over a bending roller 19 in order to be transformed, as it moves downwards, into a tube 20 which is sealed along a longitudinal seam. The tube 20 is filled with its intended contents through the filler pipe 21 and, in the tube, the filling level is marked by reference numeral 22. Under continuous movement and filling, the lower portion of the tube 20 is formed into packaging containers 1 of the intended configuration with the aid of sealing and forming devices 23 which are brought into engagement with the tube 20 and, in synchronous movement with the advancement of the tube, seal off the filled lower tube portion by flat-pressing in the transverse zones 10 of the packaging material. Advancement of the packaging material web 9 is synchronised with the movement of the sealing and forming devices 23 so that the transverse seals of the tube 20 are effected in register with the field- or panel-forming crease line pattern of the packaging material web 9. As was mentioned previously, the above crease line pattern comprises longitudinal and transverse crease lines 4 which facilitate forming of the package 1 by folding along the crease lines 4.

After sealing and forming of the package, a somewhat "cushion-shaped" package 1 is formed whose outer edges are constituted by the fold lines along the crease lines 3 and the sealing fins 2 that are formed when the packaging container 1 is, after sealing and forming, severed from the tube 20 by incisions in the transverse seals 10. The illustrated package displays in itself an "undefined" cushion shape and this may also be produced from prefabricated and punched packaging blanks which are raised and filled individually, but in the embodiment described here, the separated packages 1 have been given hexagonal cross section by fold formation along the crease lines 3 and 4 in the manner illustrated in FIG. 3, where the longitudinal overlap seam or joint of the package carries reference numeral 5.

In the manner schematically intimated in FIG. 1, the above-disclosed "primary" packaging container 1 is inserted into an autoclave 18. In the autoclave, the pressure and temperature are raised in the space 11 at the same time as the packages 1 are compressed by means of devices operating with the aid of a drive unit 24 (e.g. pressure cylinders) and associated piston rods 16. The devices or pressure plates 15 are displaced by means of their drive unit 24 from an inactive position 15' to an active position 15 in which the packages 1 are compressed together so that their thickness is reduced to a minimum, taking into account the volume of the contents and the surface of the packaging material, and finally the configuration of the package proper. The pressure against the packages 1 must not, of course, exceed the level that joint seams and packaging material can withstand, but the thickness of the package should be reduced to a minimum.

The packaging container 1 is dimensionally stable in that it is held in its "flat-pressed" thickness-reduced position while the contents, together with the packaging material, are heated to a temperature which, in autoclave treatment, exceeds 100° C. Given that the pressure in the chamber 11 is maintained above atmospheric, the boiling point of the contents in the packaging container 1 will be raised so that the contents can be heated to a temperature exceeding 100° C. without the risk of steam forming in the package. By flattening the package, heating proceeds more rapidly than if the package had retained greater thickness, and heat can be supplied with the aid of the pressure plates 15.

Figure 3:
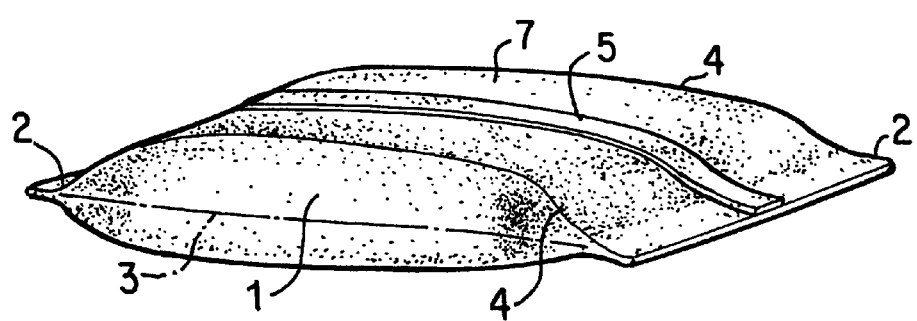
Figure 5:
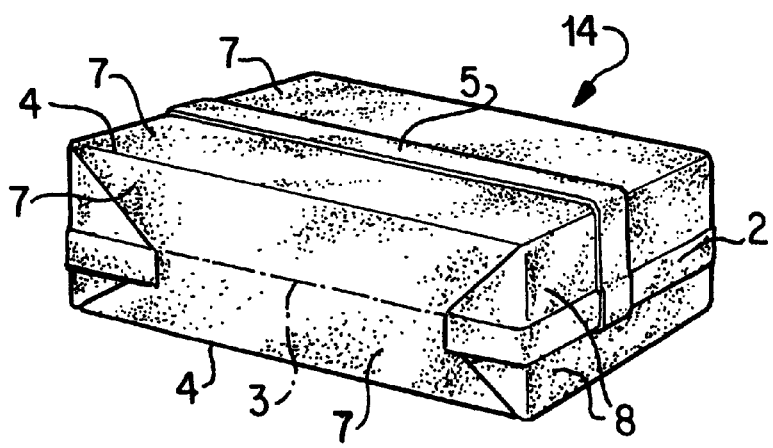
Figure 4:
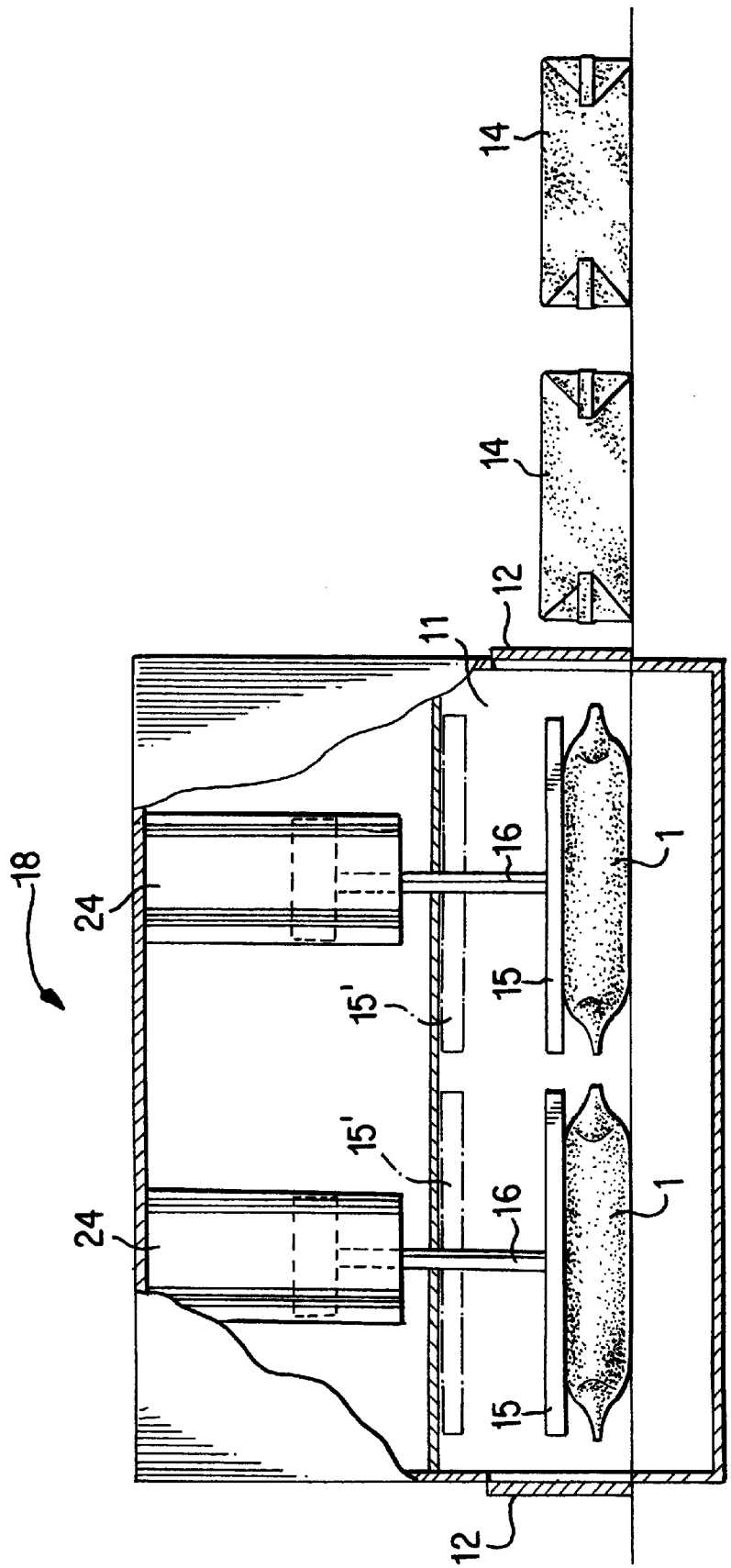

Although this is illustrated in FIG. 4, it is not unconditionally necessary to compress the packages 1 with the aid of pressure plates 15 to maintain a dimensionally stable package. As is apparent from FIGS. 3 and 5, the "cushion-shaped" package 1 which is illustrated in FIG. 3 is of lesser thickness than the package 1 which is shown in FIG. 5. This is because the closed package which is shown in FIG. 3 has not been given its ultimate form, but displays a flattened "cushion" shape. As is apparent from FIGS. 1, 3 and 5, the packages 1 and the packaging material web 9 are provided with an extra crease line 3 which is not employed as a folding line in the finished package 1 in accordance with FIG. 5. However, the crease line 3 does have an important function to fulfil in that folding of the packaging wall along this crease line entails that the packaging container 1 can be given a flatter shape (see FIG. 3), even if the packaging material is relatively rigid. The presence of the crease line or crease lines 3 thus implies that the inventive concept as herein disclosed may be applied in an efficient manner with or without the aid of the previously described pressure plates 15.

The above-described embodiment relates to the case when the package is intended to be formed by folding along crease lines previously provided in the packaging material. The method according to the present invention may, however, also advantageously be applied in cases when the package in itself has an indeterminate geometric shape, for example a bag shape or a cushion shape—the decisive factor being that the closed package with contents is heat-treated while the greatest possible "flattened" or "laid-out" shape is imparted to the package. Another precondition is that the package, after the heat treatment, is reformed so as to assume that form which is desirable for distribution and handling of the package, and this, for example in "geometrically shapeless" bag or cushion packages, can be achieved in that the package, after heat treatment and cooling, is inserted in an outer, rigid packaging, for instance an outer carton, whereupon the cushion package is automatically shaped to correspond with the defining walls of the outer carton. Naturally, it is also conceivable that the above-mentioned cushion or bag of indeterminate geometric shape can (at least partly) be given determinate shape by folding in of a part of the surface of the cushion or bag so as to form a substantially planar "standing surface" while the remaining parts of the package are of a shape which is substantially geometrically indeterminate.

According to one embodiment of the invention, the package may, for example, consist of a plurality of sheets or webs which may be edge sealed, filled and finally sealed, in which event the sealing joint or seam may consist of an inherently closed sealing seam which lies substantially in one plane and which unites the above-mentioned sheets or webs. In the event that the packages are manufactured from one web, the individual packages may be separated by incisions through the sealing zones which extend between the edge portions of the webs. In this case, there will thus be obtained a cushion-shaped package with the sealing seam or joint designed as a "frame" which forms the outer defining lines of the cushion in the plane of the sealing joint. When laid on a substrate with the plane of the sealing joint substantially in the horizontal, such a package will show a tendency to adopt a position which minimises the thickness of the cushion, implying that the cushion, when placed in an autoclave, assumes a position which is favourable for heat treatment. As was previously mentioned, the above-disclosed cushion-shaped package may be given a more permanent and determinate geometric form by inward flap folding for the formation of a standing surface, or alternatively the bag may be provided with a rigidifying label or bandoleer strip.

Alternatively, it may be inserted into an outer carton or package possessing rigid walls and a determinate geometric shape.

It has proved that, by applying the method according to the present invention, it is possible to substantially reduce the heat treatment time for foods packed in closed packages and, depending upon the form and appearance of the packaging container and the nature of the packaging material, the treatment time may be reduced by between 10 and 40 percent, which implies major economic advantages and, in addition, increased reliability that all parts of the treated food are exposed to the intended bacteria-destruction effect.

The method may be employed for treating both free-flowing and viscous foods and also for liquid foods such as soups which contain solid particles (for example peas, beans, small pieces of meat, etc.).

The present invention should not be restricted to that described above and shown on the Drawings, many modifications being conceivable without departing from the spirit and scope of the appended claims.

What is claimed is:

1. A method of achieving extended shelf life for a food, said method comprising:

enclosing the food in a discrete container of flexible or foldably formable material, wherein the shape of said container includes predefined crease lines for enabling the formation of said container into at least two container positions, a) a first container position obtained by the formation of folds along predefined crease lines such that opposing side wall panels of the container are arranged in relation to one another such that the distance between the side wall panels defines a first distance, and a layer thickness of the enclosed food defines a first food layer thickness, and b) a second container position obtained without the formation of folds along said predefined crease lines such that opposing side wall panels of the container are arranged in relation to one another such that the distance between the side wall panels defines a second distance, and the layer thickness of the enclosed food defines a second food layer thickness, treating the food in the discrete container with heat in a treatment chamber while said container maintains the first container position, and thereafter, raising said container to the second container position, said second position of the container corresponding to that form under which the container is distributed, sold or used;

wherein the first distance between the side wall panels and the first food layer thickness is less than the second distance between the side wall panels and the second food layer thickness.

2. The method as claimed in claim 1, wherein the container which is produced from the packaging material is caused to adopt said first and second positions by fold forming along fold lines which are prefabricated in the packaging material.

3. The method as claimed in claim 1, wherein said enclosing step further comprises:

producing the packaging containers from a web of packaging material which is provided with the predefined crease lines facilitating the folding formation, reforming said web into a tube by uniting longitudinal edges of the web with one another, and filling the thus formed tube with the intended contents, whereafter the tube, by repeated flat-press- and sealing operations along narrow, mutually spaced apart sealing zones, is divided into individual packaging units which are separated from the tube by incisions in said sealing zones;

wherein said separate packaging containers are formed by folding along said crease lines such that the packaging containers are given the first container position defined by a first, flat or flattened shape when the packaging material is folded along the crease lines and the packaging containers receive a polygonal cross-section;

said heat treating step further comprises introducing said separate packaging containers having said first shape into an autoclave and heat-treating the packaging containers under pressure such that a bacterial population in the contents and a bacterial presence on a surface of the packaging material are reduced; and after the heat treatment, removing said packaging containers from the autoclave and raising said packaging containers to the second container position defined by a second, final shape by refolding the packaging material along the crease lines so that some of said crease lines are included in a planar wall panel and the packaging containers are shaped into substantially parallelepipedic form by corner portions being folded into triangular, double-walled flaps which are collapsed in towards and fixed at the side surfaces and/or bottom surfaces of the packages.

4. The method as claimed in claim 1, wherein the heat treating step includes positively compressing the packages for the purpose of reducing the thickness of the packages.

5. The method as claimed in claim 1, wherein the packages include bag or cushion packages of undefined geometric configuration which consist of cushions formed from separate sheets or webs of packaging material, in which said separate sheets or component materials of said separate webs are united along an inherently enclosed sealing joint or seam extending along the sheet edges, the first position of said cushion being attained when the cushion is placed in the treatment chamber in such a manner that said sealing joint is substantially located in a horizontal plane.

6. The method as claimed in claim 1, wherein the packages include packaging containers produced from punched blanks.

7. The method as claimed in claim 1, wherein the food is substantially homogeneous in its structure and is pumpable.

8. The method as claimed in claim 1, wherein the heat treating is conducted as a continuous process in which the packages intended for heat treatment are introduced into and removed from the treatment chamber by means of sluice gates.

9. An apparatus for carrying out the method as claimed in claim 1, comprising an autoclave including one or more press devices, which, with the aid of drive means, may be moved from an upper, inactive position to a lower, active position, said devices when disposed in the lower, active position compressing filled and closed packaging containers inserted into the autoclave for the purpose of reducing the thickness of said containers during the heat treatment of the packages which is carried out in the autoclave.

10. The method as claimed in claim 1, wherein the flexible or foldably formable material enables the manufacture of a rigid, dimensionally stable container.

* * * * *